(12) United States Patent
Eom et al.

(10) Patent No.: US 8,115,602 B2
(45) Date of Patent: Feb. 14, 2012

(54) TAG ESTIMATION METHOD AND TAG IDENTIFICATION METHOD FOR RFID SYSTEM

(75) Inventors: Junbong Eom, Gyeongsangnam-do (KR); Taejin Lee, State College, PA (US)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 1039 days.

(21) Appl. No.: 12/027,756

(22) Filed: Feb. 7, 2008

(65) Prior Publication Data

US 2009/0134975 A1    May 28, 2009

(30) Foreign Application Priority Data

Nov. 23, 2007   (KR) .................. 10-2007-0120468

(51) Int. Cl.
*H04Q 5/22* (2006.01)
(52) U.S. Cl. .................... 340/10.2; 340/10.32
(58) Field of Classification Search .......... 340/825, 340/10.1–10.6, 572.1–572.9, 1.1; 235/375–385; 370/448
See application file for complete search history.

(56) References Cited

U.S. PATENT DOCUMENTS

| | | | |
|---|---|---|---|
| 5,307,349 A * | 4/1994 | Shloss et al. | 370/442 |
| 5,686,902 A * | 11/1997 | Reis et al. | 340/10.2 |
| 6,493,813 B1 * | 12/2002 | Brandin et al. | 711/216 |
| 6,563,417 B1 * | 5/2003 | Shaw | 340/10.1 |
| 6,917,291 B2 * | 7/2005 | Allen | 340/572.1 |
| 6,937,591 B2 * | 8/2005 | Guo et al. | 370/338 |
| 7,397,814 B2 * | 7/2008 | Ginzburg et al. | 370/445 |
| 7,471,199 B2 * | 12/2008 | Zimmerman et al. | 340/572.1 |
| 7,612,672 B2 * | 11/2009 | Choi et al. | 340/572.1 |
| 7,649,441 B2 * | 1/2010 | Adamec et al. | 340/10.2 |
| 2004/0046642 A1 * | 3/2004 | Becker et al. | 340/10.32 |
| 2005/0242921 A1 * | 11/2005 | Zimmerman et al. | 340/5.2 |
| 2007/0075938 A1 * | 4/2007 | Sung et al. | 345/76 |
| 2007/0126555 A1 * | 6/2007 | Bandy | 340/10.2 |
| 2008/0111661 A1 * | 5/2008 | Lin et al. | 340/10.1 |
| 2009/0040021 A1 * | 2/2009 | Seo et al. | 340/10.1 |

OTHER PUBLICATIONS

"Analysis of Contention Tree Algorithms" by Aug. J.E.M. Janssen and Marc J. M. de Jong, IEEE Transactions on Information Theory, vol. 46, No. 6, Sep. 2000.*

* cited by examiner

*Primary Examiner* — Brian Zimmerman
*Assistant Examiner* — James Yang
(74) *Attorney, Agent, or Firm* — Rabin & Berdo, P.C.

(57) ABSTRACT

Provided are a tag estimation method and a tag identification method using the same in a RFID system. In the tag estimating method, a reader divides tags in an identifiable area into a predetermined number of groups. Tags are identified by applying a pilot frame $L_p$ to a first group among the divided groups. The reader calculates a collision probability $P_{coll}$ of tags after the pilot frame ends. Then, unidentified tags of the first group, which are not identified for the pilot frame, are identified by allocating an additional pilot slot $L_{add}$ at an end of the pilot frame or generating a new frame $L_1$ according to the collision probability Pcoll.

13 Claims, 11 Drawing Sheets

| | Query | Slot 1 Coll | Slot 2 Succ | Slot 3 Idle | Slot 4 Coll | Query | Slot 1 Succ | Slot 2 Succ | Slot 3 Idle | Slot 4 Coll |
|---|---|---|---|---|---|---|---|---|---|---|
| TAG 1 | | ID | | | | | | | | |
| TAG 2 | | | ID | | | | | | | |
| TAG 3 | | | | | ID | | ID | | | |
| TAG 4 | | ID | | | ID | | | | | |
| TAG 5 | | | | | | | | ID | | ID |

FIG. 1A  PRIOR ART

TAG ESTIMATION METHOD AND TAG IDENTIFICATION METHOD FOR RFID SYSTEM

The present application claims priority under 35 U.S.C. 119 to Korean Patent Application No. 10-2007-0120468 (filed on Nov. 23, 2007), which is hereby incorporated by reference in its entirety.

TECHNICAL FIELD

Embodiments relates to a tag estimation method and a tag identification method using the same in a RFID system and, particularly to, a method for identifying tags at a high speed by dividing tags in an identifiable area into a plurality of groups, estimating the number of tags in a high speed, and effectively preventing collision of tags based on the estimated tag number.

BACKGROUND

Radio frequency identification (RFID) is one of core technologies of a ubiquitous computing generation. RFID systems are a non-contact system for identifying many objects in wide range through wireless communication between readers and tags. Particularly, the RFID system has been receiving attention as alternative of barcodes which have been widely used in physical distribution and financial service because the RFID system does not require direct contact and scanning unlike barcodes.

When a reader requests tags in an identifiable area to transmit identification numbers thereof in order to read information stored in tags in the RFID system, the tags transmit own identification number to the reader as a response for the request. However, when a plurality of tags transmit identification number to a reader at the same time, tag collision occurs. That is, when a tag transmits its information to a reader, tag collision occurs if other tags transmit their information to the same reader at the same time.

Tag collision causes a reader not to identify tags correctly and rapidly, thereby deteriorating the efficiency of a system. However, passive tags do not have abilities to solve it for themselves, because of a limited function and low cost. Thus, how to solve the program efficiently is one of the most important issues in RFID system.

Tag anti-collision protocols were separated into ALOHA based protocols and tree-based protocols.

One of the best known and the most popular tag anti-collision protocols is Framed-Slotted ALOHA (FSA).

As shown in FIG. 1a, basic framed slotted ALOHA (BFSA) identifies tags using a fixed frame size. When a reader provides necessary information such as a frame size and a random number to tags, tags receive the provided information and transmit ID numbers thereof at a calculated time slot in a frame. Here, if tag-collision occurs in one time slot, collided tags retransmit ID numbers at a next reading frame. Because of the fixed frame size of BFSA, implementation is rather easy. If, however, there are too many tags, most of timeslots experience collisions, and none of tags may be identified during long time. And many timeslots may be wasted by idle slots if the number of timeslots in the frame is much larger than that of tags.

A dynamic framed-slotted ALOHA (DFSA) algorithm can actively deal with the problem of BFSA by estimating the number of tags before tag identification and changing the frame size for efficient tag identification. The simplest DFSA algorithm changes the frame size based on the number of timeslots collided. That is, if the number of timeslots collided is larger than a threshold, a reader increases the frame size at the next frame. On the contrary, if the number of collisions is smaller than a threshold, a reader decreases the frame size at the next frame. The DFSA algorithm provides the optimal performance when the frame size is equal to the number of tags. However, the DFSA algorithm cannot accurately estimate the number of tags because the probability of collision increases when the number of tags is larger than an initial frame size.

In a tree based RFID protocol, binary tree algorithms are mostly used. FIG. 1b illustrates a binary tree algorithm. In the binary tree algorithm, if a collision occurs at one time slot, collided tags are randomly separated into two subgroups until all the tags are successfully identified by a reader. The binary tree algorithm is very efficient when the number of tags is small. When the number of tags is large, many collisions occur at the early state. Therefore, many time slots are wasted.

As a compromise of DFSA and binary tree algorithm, a framed-slotted ALOHA with tag estimation and binary splitting (EBFSA) was introduced in an article entitled "Identification of RFID Tags in Framed-Slotted ALOHA with Robust Estimation and Binary Selection" IEEE Communication Letters, vol. 11, no. 5, pp. 452-454, 2007. FIG. 1c illustrates an EBFSA algorithm according to the related art. As shown, EBFSA algorithm is divided into estimation phase and identification phase. A reader performs tag estimation using a fixed frame size $L_{est}$ in the estimation phase. Since it is difficult to accurately estimate the number of tags if a collision probability exceeds a threshold, a reader decreases the number of tags using a bit mask. This process is repeated until the probability of collision is lower than a threshold. After the estimation phase, the identification phase starts. The initial frame size of identification phase is determined by the tag estimation. In the identification phase, when the tags are collided in a timeslot, a reader resolves the collision by binary tree algorithm. The EBFSA algorithm may improve performance by taking the advantages of the DFSA algorithm and a tree based protocol. However, the EBFSA still needs additional time slots to estimate the number of tags.

SUMMARY

Embodiments have been proposed in order to provide a method for estimating the number of tags and a method for identifying tags using the same in a RFID system, which can identify tags at a high speed by minimizing the number of time slots for identifying tags through estimating the number of tags by dividing tags in an identifiable area into a plurality of groups and effectively preventing tag collision based on the estimated number.

In embodiments, a method for estimating the number of tags in a RFID system includes the steps of: a) at a reader, dividing tags in an identifiable area into a predetermined number of groups; b) identifying tags by applying a pilot frame $L_p$ to a first group among the divided groups in the step a); c) at a reader, calculating a collision probability $P_{coll}$ of tags after the pilot frame ends; and d) identifying unidentified tags of the first group, which are not identified for the pilot frame, by allocating an additional pilot slot Ladd at an end of the pilot frame or generating a new frame $L_1$ according to the collision probability $P_{coll}$.

In the step a), the reader may use a bit mask to divide tags into a predetermined number of groups.

In the step b), when tags collide during the pilot frame $L_p$, random counters of collided tags may be changed according to the number of remaining time slots in the pilot frame and a collision order in the pilot frame and an identification number of a tag is transmitted at a time slot where the random counter become 0.

The step d) may include the step of comparing the collision probability $P_{coll}$ with a predetermined threshold $P_{th}$. If the collision probability $P_{coll}$ is smaller than the predetermined threshold $P_{th}$, an additional time slot $L_{add}$ may be allocated at an end of the pilot frame, and unidentified tags in the first group are identified. If the collision probability $P_{coll}$ is larger than the predetermined threshold $P_{th}$, unidentified tags in the first group may be identified by generating a new frame after the pilot frame.

In the additional time slot $L_{add}$, tags may transmit identification numbers thereof to a reader when random counters of the tags, which continuously decrease from the pilot frame $L_p$, become 0, and collided tags in the additional time slot $L_{add}$ select 0 or 1 as a random counter, remaining unidentified tags increase random counters by 1, each of tags decreases a random counter sequentially, and each of tags transmits an identification unit at a time slot where a random counter becomes 0.

In the new frame $L_1$, unidentified tags, which are not identified in the pilot frame $L_p$, may begin counting a new random counter and transmit an identification number to a reader when the new random counter become 0, and collided tags in the new frame $L_1$ may select 0 or 1 as a random counter, remaining unidentified tags increase random counters by 1, each of tags sequentially decreases a random counter, and each of tags transmits an identification number at a time slot where a random counter becomes 0.

In another embodiments, a method for identifying tags in a RFID system, includes the steps of: a) at a reader, dividing tags in an identifiable area into a predetermined number of groups; b) identifying tags by applying a pilot frame $L_p$ to a first group among the divided groups in the step a); c) at a reader, calculating a collision probability $P_{coll}$ of tags after the pilot frame ends; d) identifying unidentified tags of the first group, which are not identified for the pilot frame, by allocating an additional pilot slot $L_{add}$ at an end of the pilot frame or generating a new frame $L_1$ according to the collision probability $P_{coll}$; e) deciding an optimal frame size $L_{opt}$ based on the number of tags of the first group, which are estimated through the steps a) to d); f) identifying tags in a second group by applying the decided optimal frame size $L_{opt}$; and g) identifying tags of a current group by applying an optimal frame size $L_{opt}$ decided based on the number of identified tags in a previously group, and repeating the step g) for identifying tags in remaining groups after the second group.

The optimal frame size $L_{opt}$ may be decided by differentiating an equation for the number n of tags identified in a previously groups, where the equation is:

$$T = \sum_{k=0}^{n} {}_nC_k \left(\frac{1}{L_{opt}}\right)^k \left(1 - \frac{1}{L_{opt}}\right)^{n-k} L_{opt}(\alpha_k + 1).,$$

wherein T denotes the total number of time slots for identifying tags, n is the number of identified tags in a previous group. k is the number of tags transmitted in one time slot, and αk is the average number of time slots used for a binary tree algorithm when collision occurs.

The optimal frame size may be 0.88n where n is the number of identified tags in a previous group.

In the steps f) and g), each of tags may transmit an identification number to a reader when a random counter becomes 0, tags collided in a corresponding frame may select 0 or 1 as a random counter, each of remaining unidentified tags may increase a random counter by 1, each of tags sequentially may decrease a random counter, and each of tags may transmit an identification number at a time slot where a random counter becomes 0.

DRAWINGS

FIGS. 1a to 1c illustrate a BFSA algorithm, a binary tree algorithm, and an EB-FSA algorithm for preventing tag collision in accordance with the related art.

DESCRIPTION

Hereinafter, embodiments of the present invention will be described in detail with reference to the accompanying drawings. The present invention relates to a method for identifying tags by estimating the number of tags in a pilot frame to prevent tag collision and identifying tags using a DFSA algorithm and a binary tree algorithm according to the estimated number of tags. Therefore, a tag estimation method and a tag identification method according to the present invention are referred as Framed-Slotted ALOHA with Estimation by Pilot Frame and Identification by Binary Selection (FSAPB).

The tag estimation method for estimating the number of tags in a RFID system in accordance with an embodiment of the present invention will be described with reference to a flowchart of FIG. 2 and diagrams of FIGS. 4a and 4b.

Figure 1B:
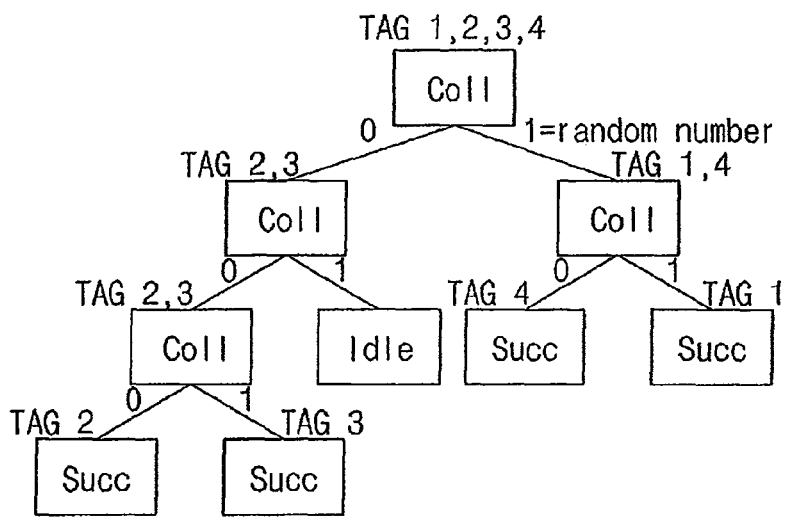
Figure 1B:
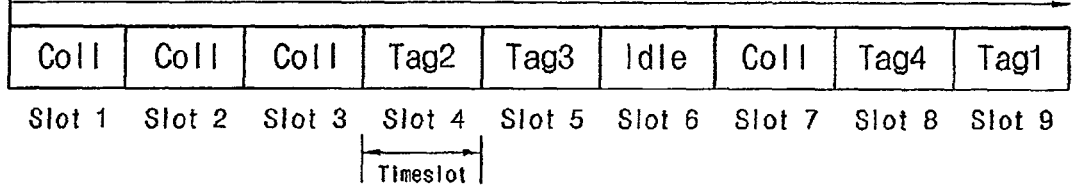
Figure 1C:
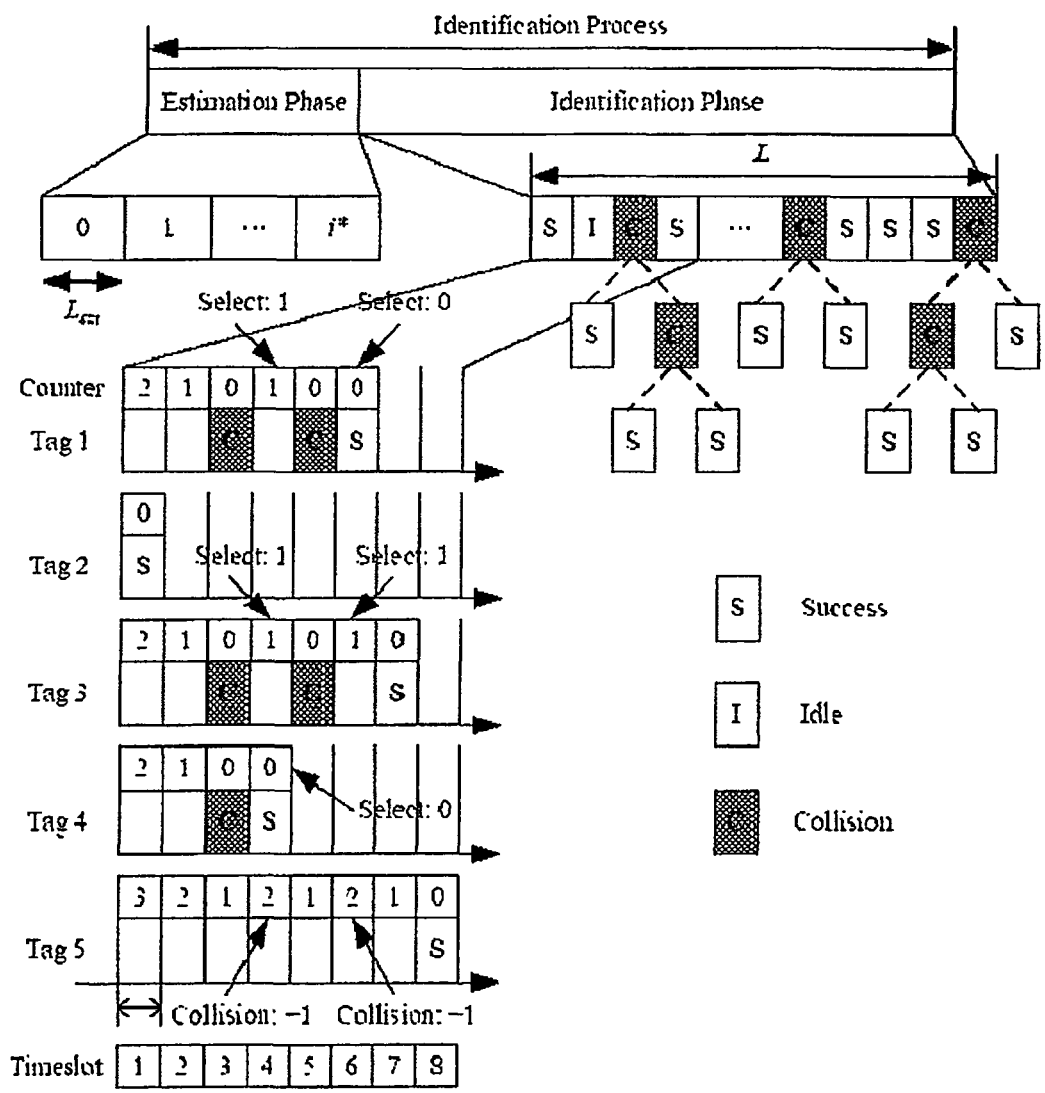
Figure 2:
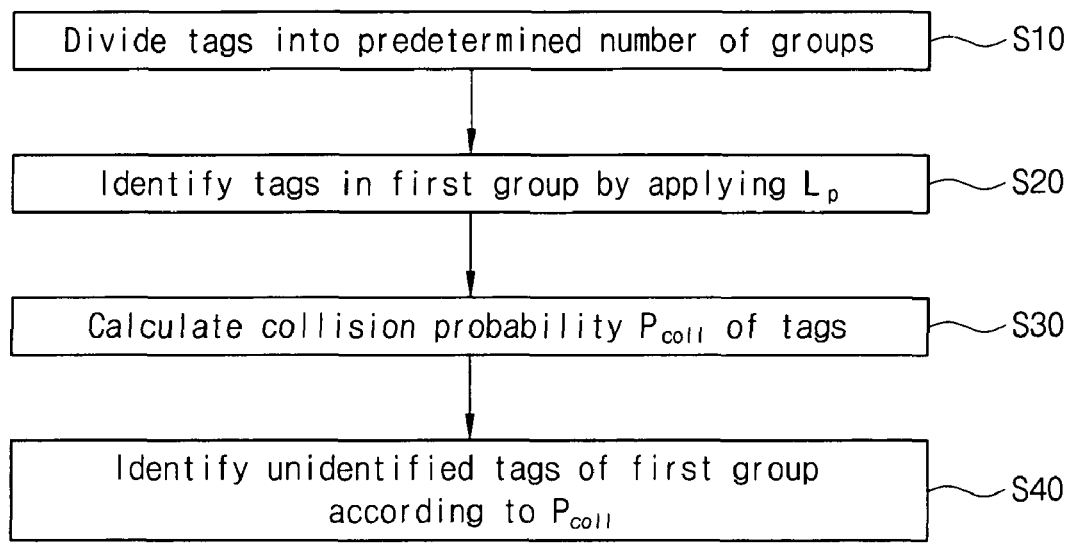
FIG. 2 is a flowchart of a method for estimating the number of tags in a RFID system in accordance with an embodiment of the present invention.

As shown in FIG. 2, the method for estimating the number of tags according to the present embodiment includes dividing tags into a predetermined number of groups at step S10, reading tags by applying a pilot frame $L_p$ to a first group among the divided groups at step S20, calculating a collision probability $P_{coll}$ of tags at a reader after the pilot frame ends at step S30, and identifying tags of a first group which are not identified for a pilot frame according to the collision probability $P_{coll}$.

In the step S10, a reader may divide tags in an identifiable area into M groups using a bit mask. The reason of dividing the tags into M groups in the present embodiment is to prevent time slots from being wasted due to tag collision that may occur when estimation is progressed for too many tags.

Furthermore, if the number of tags in a predetermined group is estimated using a bit mask that can uniformly divide tags, the number of tags in the other groups can be estimated under an assumption that all of remaining groups have the uniform random distribution. Although the bit mask may not have perfect uniform random distribution, the significant number of time slots for estimating the number of tags can be advantageously reduced. Meanwhile, if the tags are divided into too many groups in the step S10, the tags may not uniformly distributed in each of groups. Therefore, it is prefer to carefully decide the number M of groups through simulations.

In the step S20, the reader identifies tags in the first group by applying a pilot frame $L_p$ to the first group among the groups divided in the step S10. Referring to FIGS. 4a and 4b, all of tags in the first group transmit their identification numbers during the pilot frame in response to a request of a reader. That is, each of tags transmits an identification number at a time slot where a random counter thereof becomes 0, thereby being identified by a reader.

If a reader fails to identify a tag because tag collision occurs during a pilot frame $L_p$, a random counter of a collided tag is changed according to the number of remaining time slots in a pilot frame and an collision order in a pilot frame. Then, the tags retransmit identification numbers at a time slot where the random counter becomes 0. For example, a random counter of a collided tag may be decided by Eq. 1.

Counter=the number of time slots remained remaining in $L_p$+2×(collision order−1)+rand(0 or 1)  Eq. 1

After the tag identification process is finished in the pilot frame, a reader calculates a collision probability of collision $P_{coll}$ at step S30. The collision probability $P_{coll}$ may be calculated by dividing the number of time slots where collision occurs in a pilot frame by the number of total time slot of the pilot frame.

Then, unidentified tags in the first group, which are not identified for a pilot frame due to tag collision, are identified at the step S40. In the step S40, the calculated collision probability $P_{coll}$ is compared with a predetermined threshold $P_{th}$ after the pilot frame. If the collision probability $P_{coll}$ is smaller than the predetermined threshold $P_{th}$, tags are identified by allocating an additional time slot $L_{add}$ at the end of the pilot frame. If the collision probability Pcoll is larger than the predetermined threshold $P_{th}$, tag identification is performed by generating a new frame $L_1$ after a pilot frame.

The collision probability $P_{coll}$ smaller than the predetermined threshold $P_{th}$ means that the number of collided tags in one time slot is comparatively small. Therefore, a reader allocates an additional time slot $L_{add}$ at the end of a pilot frame in order to solve tag collision problem in a pilot frame. In the additional time slot $L_{add}$, tags transmit identification numbers to a reader until random counters of tags become 0, which are continuously subtracted in the pilot frame $L_p$. In this process, tags collided in the additional time slot $L_{add}$ select 0 or 1 as a random counter thereof, and unidentified tags increase the random counter by 1. Then, the random counters of the tags sequentially decrease. Each of the tags transmits the identification number thereof at a time slot where the counter becomes 0, thereby being identified by the reader.

The tag identification process in an additional time slot $L_{add}$ will be described with reference to FIG. 4a.

Figure 4A:
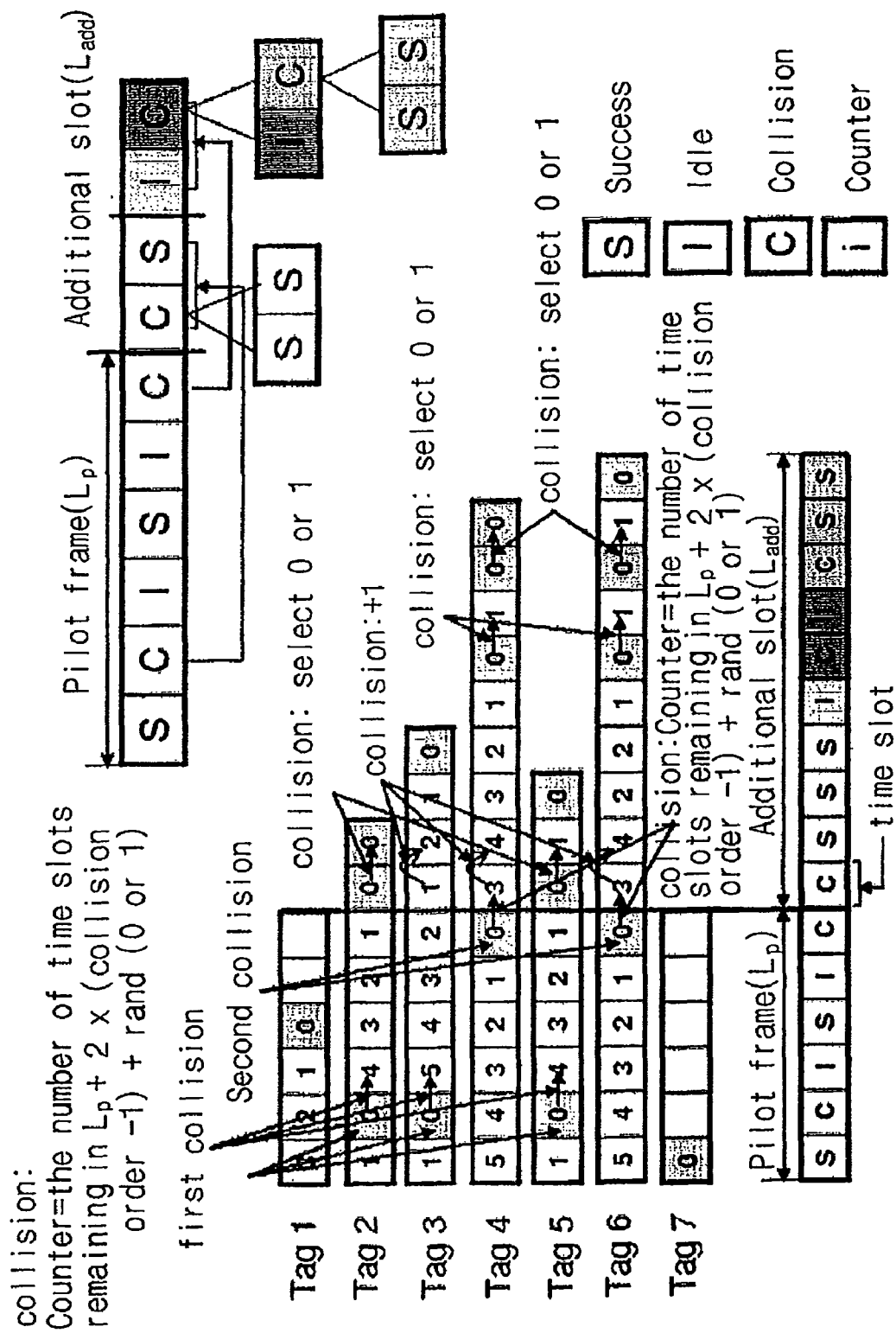
FIGS. 4a and 4b are diagrams for describing a method for estimating the number of tags in a RFID system in accordance with an embodiment of the present invention.

As shown in FIG. 4a, a reader can identify Tag 1 and Tag 7 during a pilot frame $L_p$. Tag 2, Tag 3, and Tag 5 collide at the pilot frame. Tag4 and Tag6 collide in a pilot frame. Therefore, random counters of the collided tags are changed according to Eq. 1 in order to identify the collided tags at an additional time slot $L_{add}$ allocated at the end of the pilot frame.

Then, tags are identified at the additional time slot $L_{add}$ based on a binary tree algorithm. That is, Tag 2 and Tag 5 collide at the first slot of the additional time slot $L_{add}$ select 0 or 1 as a random counter. Due to the collision, remaining other tags increase the counter values thereof by 1. Also, Tag4 and Tag6 collided in the additional time slot Ladd select 0 or 1 as a random counter and transmit the identification number thereof when the random counter thereof becomes 0.

If the collision probability $P_{coll}$ is larger than a predetermined threshold $P_{th}$, collisions occur most of time slots in a pilot frame. In this case, a reader applies a new frame $L_1$ to identify unidentified tags in a first group instead of allocating an additional time slot $L_{add}$ at the end of the pilot frame. In the new frame L1, the unidentified tags transmit identification numbers thereof to a reader until random counters thereof become 0 by discounting the new random counters. Here, collided tags in the new frame L1 select 0 or 1 as the random counters thereof, and remaining unidentified tags increase the random counters thereof by 1. Then, the random counter of each tag sequentially decreases and each tag transmits an identification number thereof to a reader at a time slot where the counter value becomes 0.

In the FSAPB algorithm according to the present invention, the number of tags can be estimated by applying an equation used for estimating the number of tags in a DFSA algorithm into a pilot frame $L_p$. That is, the number of tags is estimated using Eq. 2 in the present embodiment.

$$P_{coll} = 1 - P_{idle} - P_{succ}$$  Eq. 2

$$= 1 - \left(1 - \frac{1}{L_p}\right)^n - n\frac{1}{L_p}\left(1 - \frac{1}{L_p}\right)^{n-1}.$$

In Eq. 2, n denotes the number of tags, $L_p$ denotes a size of a pilot frame, $P_{coll}$ denotes a collision probability, $P_{idle}$ denotes a valid probability, and $P_{succ}$ is a success probability.

Meanwhile, a new frame size of the step S40 may be determined by replacing the number of tags n with a new frame size L1 in Eq. 2. That is, a new frame size can be obtained by applying a size of a pilot frame $L_p$ applied to a first group and the collision probability $P_{coll}$ calculated at the step S30 into Eq. 2 and replacing the number of tags with the new frame size $L_1$ (n=$L_1$). It is not necessary to accurately estimate the number n of tags to optimally set a size of a new frame $L_1$. It is because more time slots may be wasted to accurately estimate the number of tags. Preferably, the size of a new frame is set as a minimum value of n that satisfy Eq. 2 in consideration of successfully identified tags in a pilot frame and an optimal frame size.

Tag identification in a new frame L1 will be described when the collision probability $P_{coll}$ is larger than a predetermined threshold $P_{th}$ with reference to FIG. 4b.

Figure 4B:
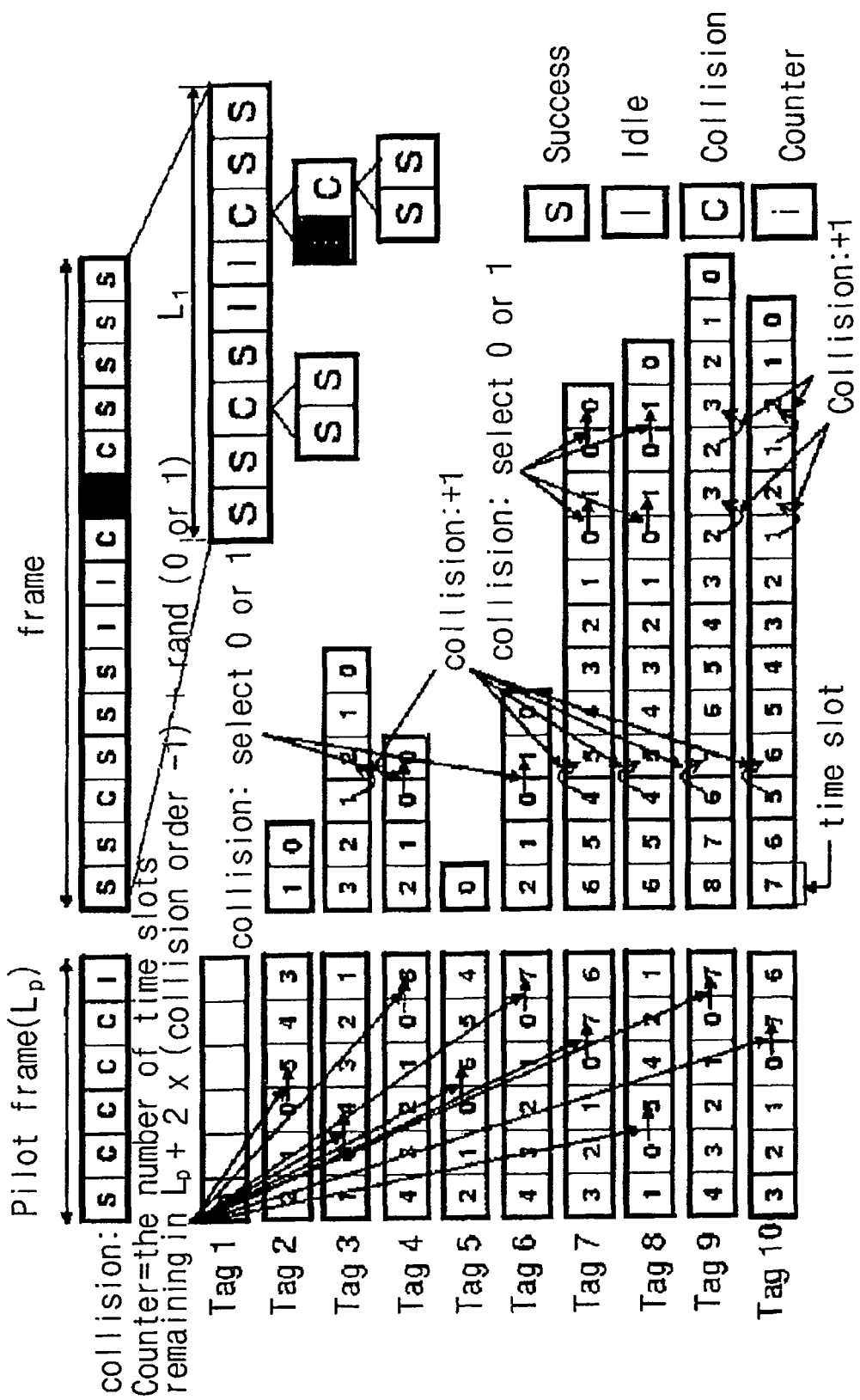

Referring to FIG. 4b, a reader can identify Tag 1 during a pilot frame $L_p$ at first. With exception of Tag1, remaining tags collide and retransmit identification numbers thereof in the new frame $L_1$.

In the tag identification process of the new frame L1, Tag4 collides with a sixth tag Tag6 in a third time slot. The collided fourth tag Tag4 and sixth tag Tag6 select 0 or 1 as a random counter thereof, and other unidentified tags increase their random counters by 1. Tags transmit their identification numbers until random counters thereof become 0.

As described above, in the method for estimating the number of tags based on FSAPB algorithm according to the present embodiment, a reader divides tags in an identifiable area using a bit mask, performs tag identification by applying a pilot frame only to a predetermined divided group. Therefore, the number of time slots used for estimating the number of tags is minimized. That is, a reader can quickly identify all of tags in a first group and estimate the number of tags in following groups based on the estimated number of tags through the steps S10 to S40.

Hereinafter, a method of identifying tags using the method of estimating the number of tags in accordance with an embodiment of the present invention will be described with reference to FIG. 3.

Figure 3:
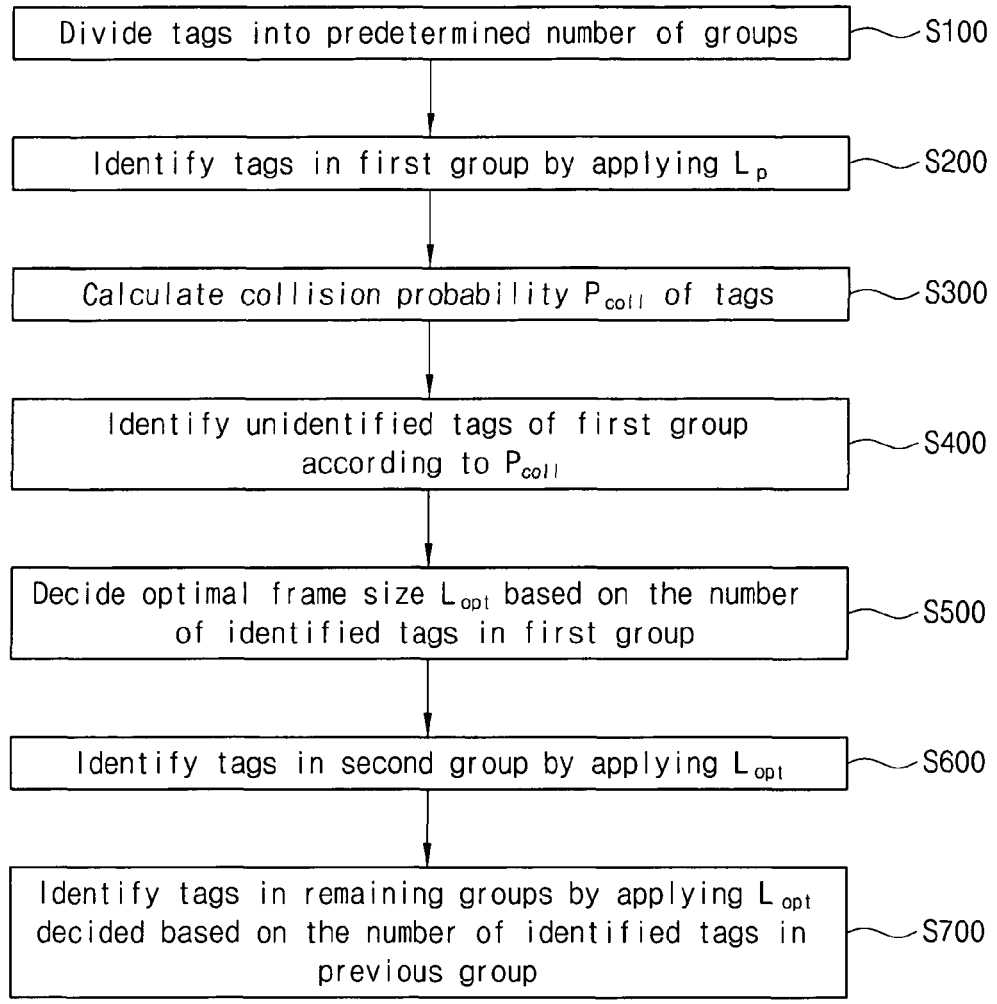
FIG. 3 is a flowchart of a method for identifying tags in a RFID system in accordance with an embodiment of the present invention.

As shown in FIG. 3, the tag identifying method according to the present embodiment includes dividing tags into a predetermined number of groups at step S100, reading tags by applying a pilot frame $L_p$ to a first group among the divided groups at step S200, after the pilot frame ends, calculating a probability of tag collision by a reader at step S300, identifying unidentified tags, which are not identified for a pilot frame, based on the probability of tag collision at step S400, deciding an optimal frame size $L_{opt}$ based on the estimated number of tags in the first group at step S500, identifying tags in a second group by applying the optimal frame size $L_{opt}$ at step S600, and identifying tags in a current group by applying an optimal frame size $L_{opt}$ that is decided based on an identified number of tags in a previous group, and repeatedly performing tag identification until all tags in all groups are identified at step S700.

As described above, the tag identification method according to the present embodiment uses the tag estimation method according to an embodiment of the present invention which was described above. Since the steps S100 to S400 are identical to processes for estimating the number of tags, detail descriptions thereof are omitted.

Figure 5A:
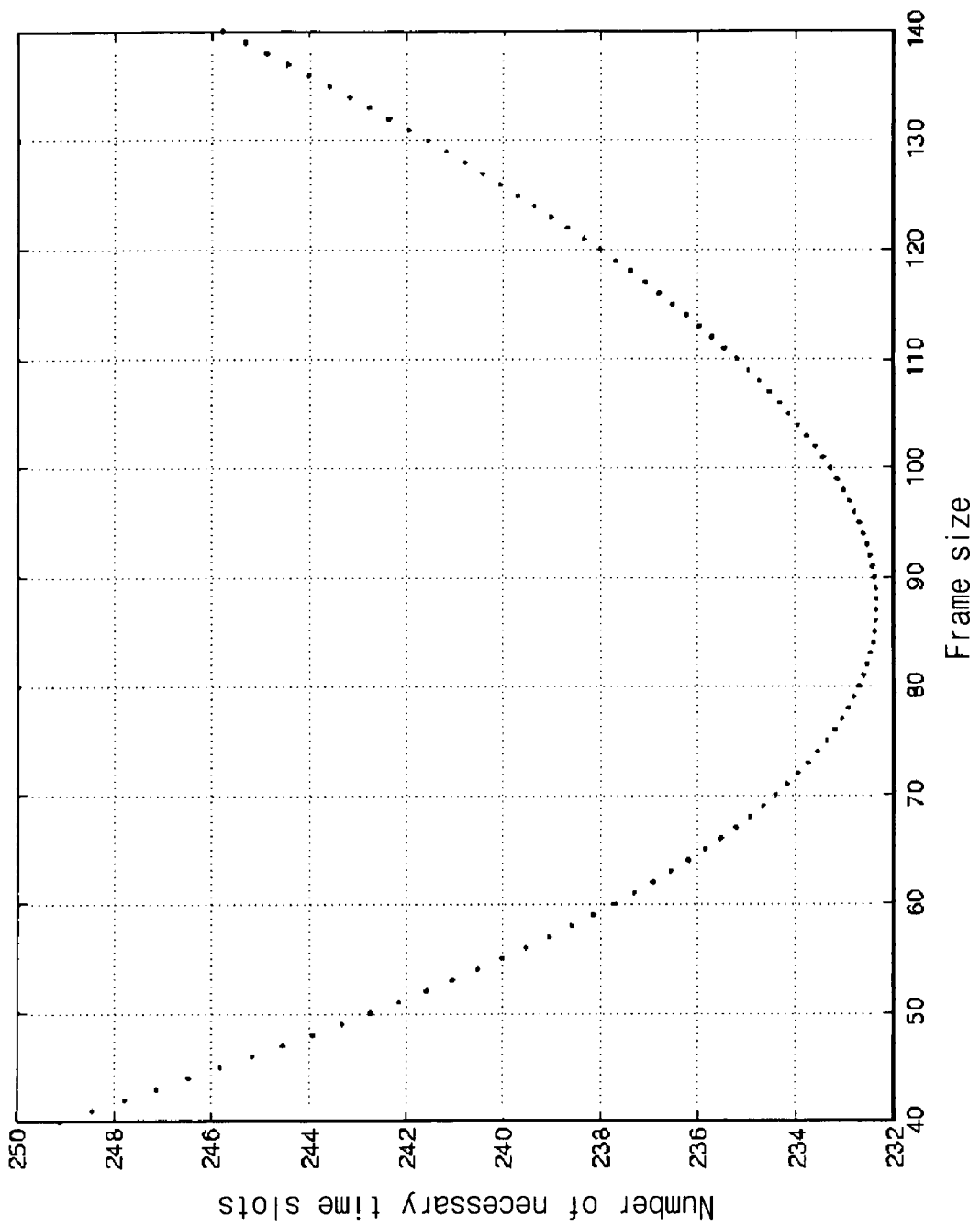
FIG. 5a is a graph showing frame sizes according to the number of time slots when the number of tags is 100 in a RFID system where the present invention is applied.

In the step S500, a reader decides an optimal frame size $L_{opt}$ based on the number of tags in the first group, which is estimated through the steps S200 to S400. It has been known that a DFSA algorithm provides the optimal performance when a frame size is equal to the number of tags. However, FIG. 5a shows that the optimal frame size is not equal to the number of tags although the tag identification method according to the present embodiment partially uses the DFSA algorithm. Here, FIG. 5a is a graph showing the necessary number of time slots according to a frame size when the number of tags is 100. In the present embodiment, the optimal frame size $L_{opt}$ is decided using Eq. 3 which is introduced in an article entitled "Analysis of contention Tree Algorithms", IEEE Trans. on Information Theory, vol. 46, no. 6 pp. 2163-2172, September 2000.

$$T = \sum_{k=0}^{n} {}_nC_k \left(\frac{1}{L_{opt}}\right)^k \left(1 - \frac{1}{L_{opt}}\right)^{n-k} L_{opt}(\alpha_k + 1).$$ Eq. 3

In Eq. 3, T denotes the total number of time slots for identifying tags, n is the number of identified tags in a previous group. k is the number of tags transmitted in one time slot, and $\alpha k$ is the average number of time slots used for a binary tree algorithm when collision occurs.

Figure 5B:
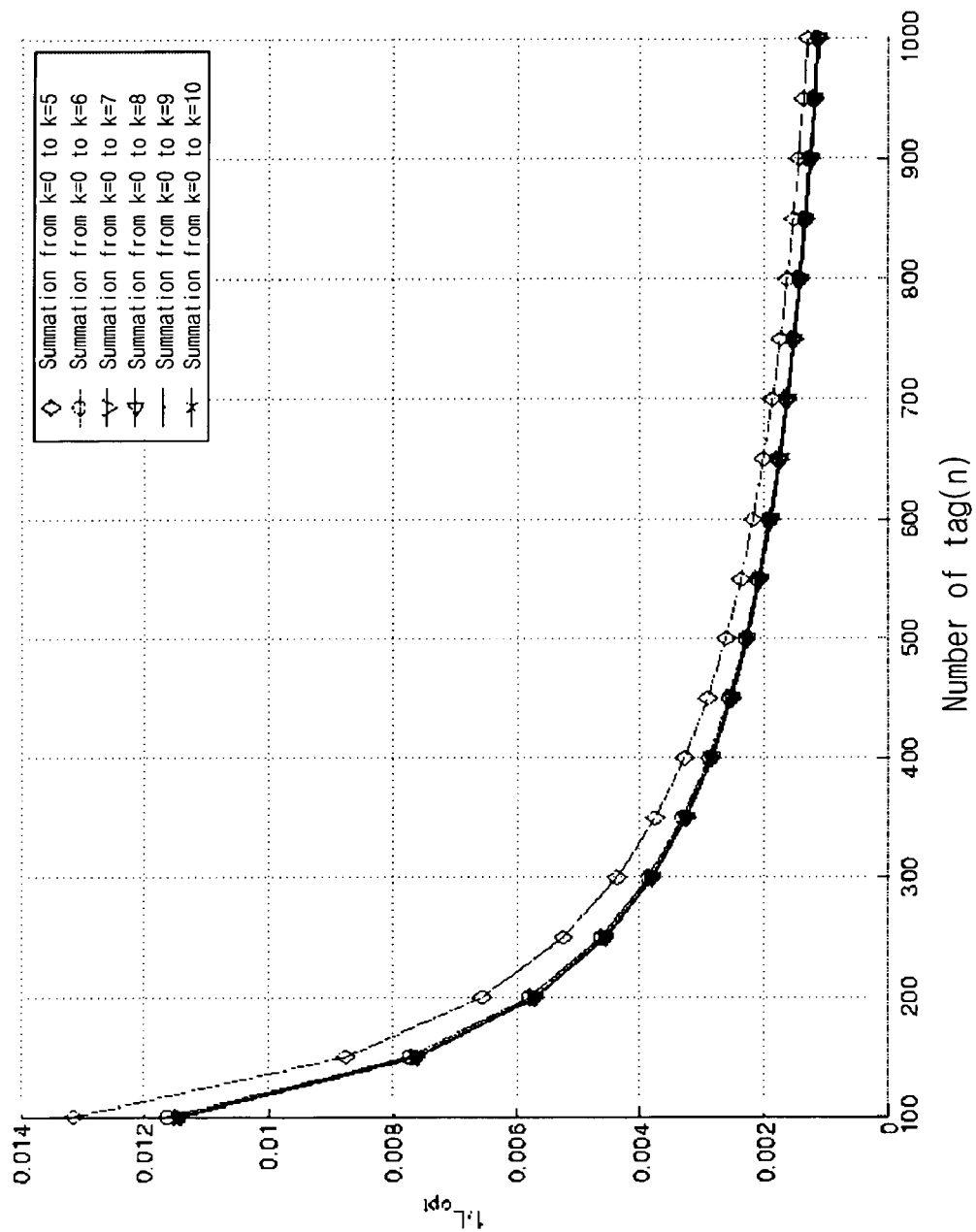
FIG. 5b is a graph showing $1/L_{opt}$ values according to the number of tags in a RFID system where the present invention is applied.

In Eq. 3, the optimal frame size $L_{opt}$ is a value that returns 0 after differentiating Eq. 3. It is very difficult to differentiate Eq. 3 for various n. However, FIG. 5b shows that the optimal frame size Lopt is about 0.88n where n denotes the number of identified tags in a previous group. FIG. 5b is a graph showing $1/L_{opt}$ according to the number n of tags. As shown in the graph of FIG. 5b, $1/L_{opt}$ is not influenced by n if k becomes larger. Therefore, it is possible to differentiate Eq. 3 for a predetermined range of k. Accordingly, the optimal frame size Lopt can be calculated by multiplying a predetermined constant ($\gamma$=0.88) with the number of tags n in the present embodiment.

After deciding the optimal frame size Lopt based on the number of identified tags in the first group through the step S500, tags in a following group which is a second group are identified by applying the decided optimal frame size $L_{opt}$ at step S600.

Since it is assumed that a bit mask divides tags at uniform distribution in the present embodiment, it is not necessary to perform a process of estimating the number tags by applying a pilot frame after a reader identifies all of tags in a first group. That is, it is assumed that a second group has the same number of tags of the first group. Tags in the second group are identified by applying the optimal frame size $L_{opt}$ decided based on the number of identification tags in the first group. Also, tags in a following group, which is a third group, are identified by applying the optimal frame size $L_{opt}$ decided based on the number of identification tags in the second group.

As described above, an optimal frame size $L_{opt}$ of a current group is decided based on the number of identified tags in a previous group. In the step S700, the tag identification process is repeated by applying an optimal frame size until all of tags in remaining groups are identified.

After an optimal frame size is decided, tag identification is performed based on a binary tree algorithm for remaining groups including a second group. That is, tags in each of groups transmit identification numbers to a reader until random counters thereof become 0 in a frame with the binary tree algorithm applied. In a corresponding frame, collided tags select 0 or 1 as a random counter and unidentified tags increase random counter thereof by 1. Then, each of tags decreases a random counter thereof sequentially, and transmits an identification number in a time slot where the random counter becomes 0.

As described above, after the first group, the tag identification method according to the present embodiment estimates the number of tags in a current group based on the number of identified tags in a previous group without wasting time slots using the tag estimation method that estimates the number of tags at high speed using a pilot frame. Then, an optimal frame size is calculated from the estimated number of tags, and tag identification is performed by changing a frame size based on the calculated optimal frame size. Thus, tag collision is effectively prevented, and the overall number of time slots for tag identification is minimized, thereby identifying tags at a high speed.

Following simulation results clearly show that the tag estimation method and the tag identification method according to the present embodiment provide better performance than an anti-collision method according to the related art. Based on the simulation results, the performance of a system employing the FSAPM algorithm according to the present embodiment is compared with the performances of systems employing a DFSA algorithm, a binary tree algorithm, and an EB-FSA algorithm. The simulations were performed under following conditions. A reader identifies all tags. The number of tags increases from 100 to 1000. In the system employing the FSAPB algorithm according to the present embodiment, parameters set as L.sub.p=36, P.sub.th=0.6, and M=4. The system employing the EB-FSA algorithm was simulated based on conditions described in an article entitled "Identification of RFID Tags in Framed-Slotted ALOHA with Robust Estimation and Binary Selection", IEEE Communication Letters, vol. 11, no. 5, pp. 452-454, 2007. The system employing the DFSA algorithm was simulated under an assumption that the initial number of tags is known and the estimated number of tags is very accurate.

Figure 6A:
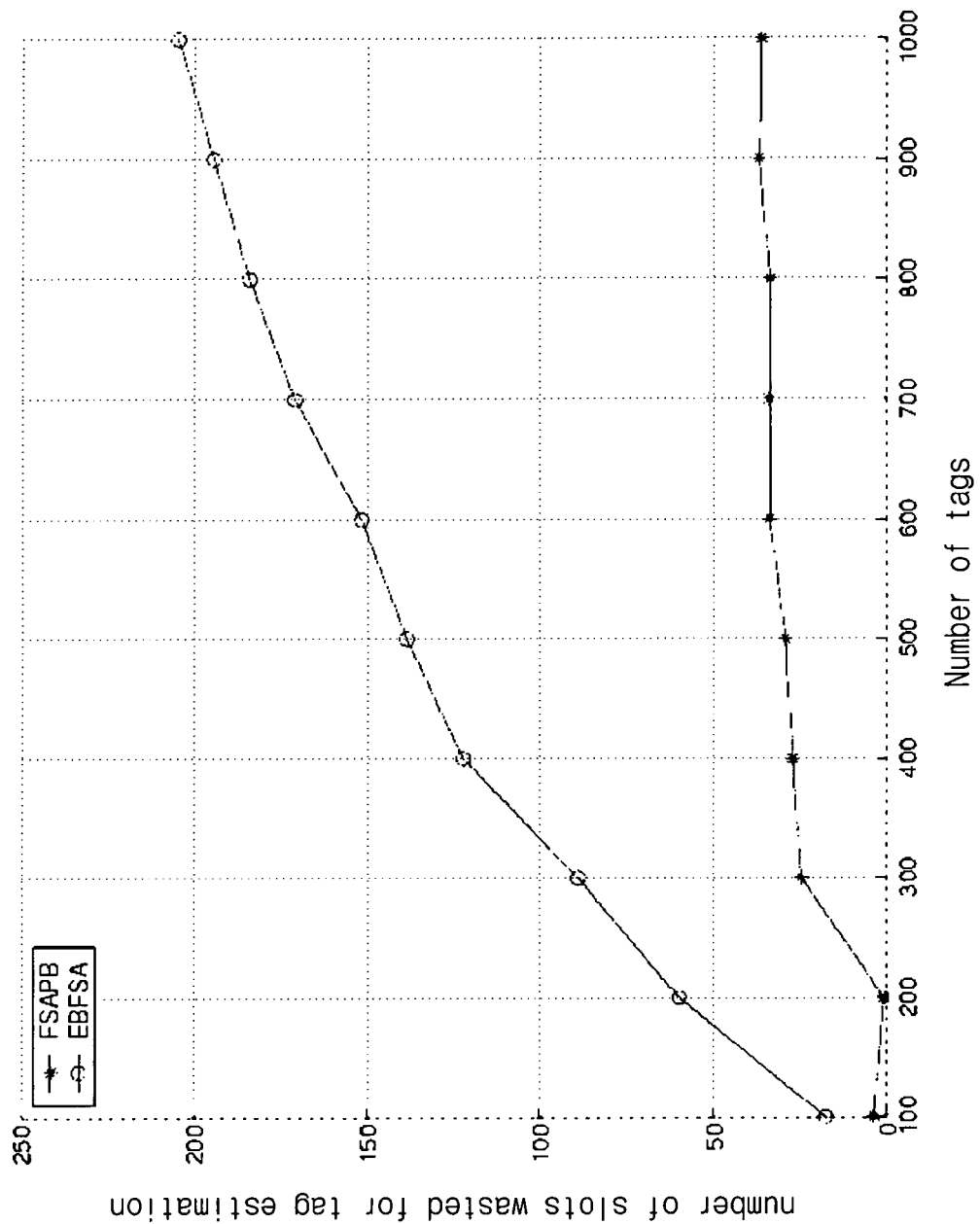
FIG. 6a is a graph showing the number of time slots wasted for estimating the number of tags according to the number of tags in order to compare a performance of a tag estimation method according to the present invention with that of EB-FSA algorithm.

FIG. 6a is a graph showing the number of time slots used for estimating the number of tags according to the number of tags based on the simulation results. As shown in FIG. 6a, the FSAPM based system according to the present embodiment uses much less time slots for estimating the number of tag compared to the EB-FSA based system. In the graph of the FSAPM based system according to the present invention, discontinuity is shown where the number of tags n is 200 (n=200). It is because the FSAPM based system uses an additional time slot $L_{add}$ when the number of tags is smaller than 200 and uses a new frame $L_1$ when the number of tags is larger than 300. That is, the FSAPM based system identifies remaining tags using an additional time slot $L_{add}$ because a collision probability $P_{coll}$ is smaller than a predetermined threshold $P_{th}$ in a pilot frame $L_p$ when the number of tags is smaller than 200. However, when the number of tags is from 300 to 1000, many tag collisions occur in the pilot frame $L_p$. Thus, the FSAPM based algorithm applies a new frame $L_1$ to identify remaining frames. Furthermore, the size of a pilot frame of the FSAPB based system is comparatively small ($L_p$=36) in an entire process of changing the number of tags changes from 100 to 1000. However, the graph shows that the EB-FSA based system uses much more time slots for estimating the number of tags as the number of tags increases. For example, the EB-FSA based system uses time slots 5.5 times than the FSAPB based system according to the present embodiment.

Figure 6B:
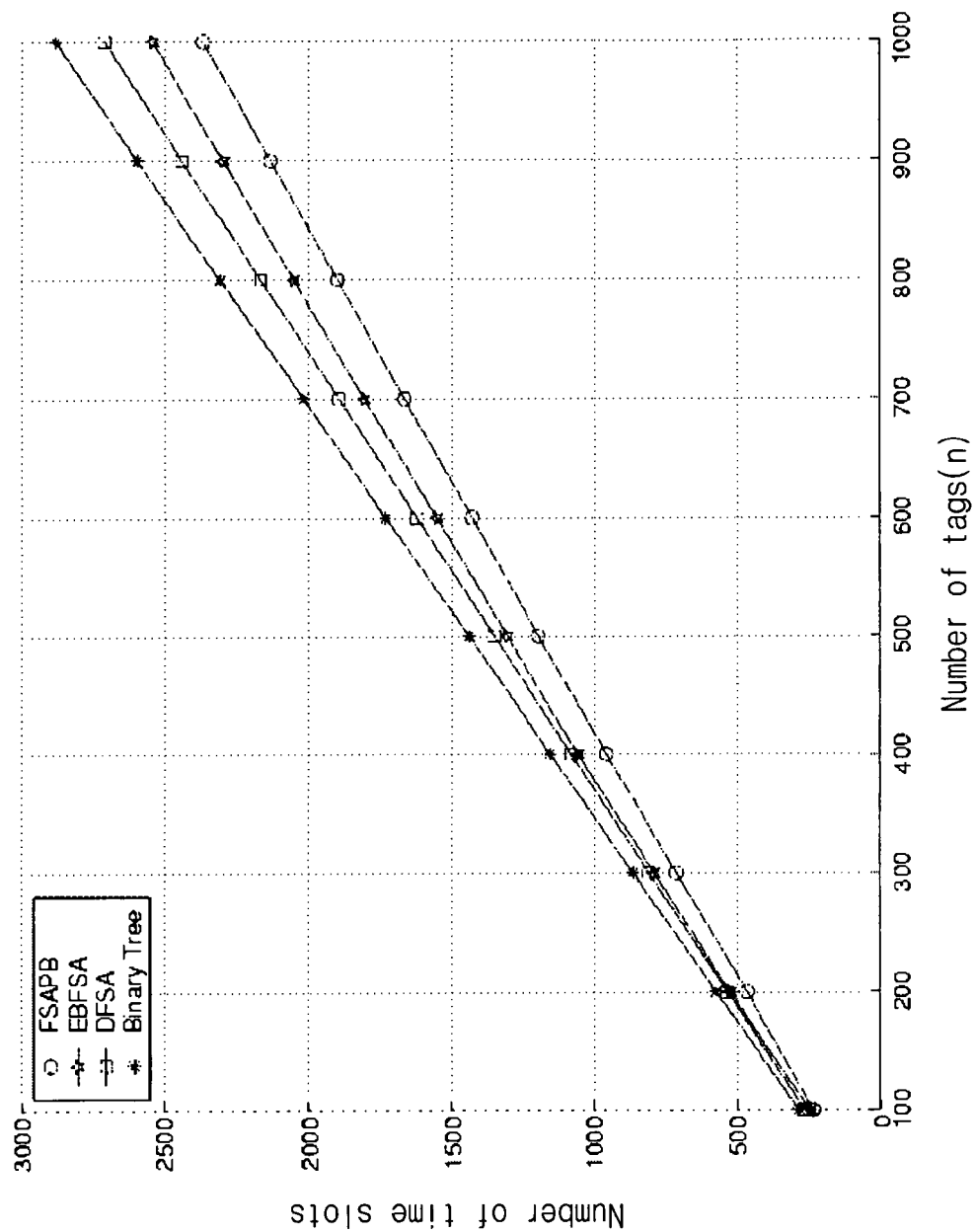
FIG. 6b is a graph showing the number of time slots used for identifying tags according to the number of tags in order to compare the performance of a tag identification method according to the present invention with that of a tag identification method according to the related art.

FIG. 6b shows the number of time slots used for identifying tags according to the number of tag in order to compare a FSAPB algorithm according to the present invention, an EB-FSA algorithm, a DFSA algorithm, and a binary tree algorithm in performance. As shown in FIG. 6b, those algorithms provide similar performances when the number of tags is small. However, the graph clearly shows that the FSAPB algorithm according to the present invention is much more efficient when the number of tags is large. For example, the EB-FSA algorithm, the DFSA algorithm, and the binary tree algorithm use 7.3%, 14.7%, 21.9% of more time slots than the FSAPB algorithm according to the present invention.

As described above, the method for estimating the number of tags in a RFID system according to the present embodiment divides tags into a plurality of groups using a bit mask and applies a pilot frame. Therefore, the number of time slots for estimating the number of tags is significantly reduced, thereby estimating the number of tags at a high speed.

As described above, the method for identification tags in a RFID system decides an optimal frame size based on the estimated tag number and applies the optimal frame size to identify tags in following groups, thereby effectively preventing tag collision. Therefore, the method for identification tags according to the present invention can identify tags at a high speed.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A method for estimating the number of tags in a RFID system, comprising the steps of:
   a) at a reader, dividing tags in an identifiable area into a predetermined number of groups;
   b) identifying tags of a first group among the divided groups determined in step a), by applying a pilot frame $L_p$ to the first group;
   c) at the reader, calculating a collision probability $P_{coll}$ of tags of the first group after the pilot frame $L_p$ ends; and
   d) identifying unidentified tags of the first group, which are not identified for the pilot frame $L_p$, by allocating an additional pilot slot $L_{add}$ at an end of the pilot frame $L_p$ or generating a new frame $L_1$ according to the collision probability $P_{coll}$ by comparing the collision probability $P_{coll}$ with a predetermined threshold $P_{th}$,
      wherein if the collision probability $P_{coll}$ is smaller than the predetermined threshold $P_{th}$, the additional pilot slot $L_{add}$ is allocated at the end of the pilot frame $L_p$, to identify unidentified tags in the first group, and
      wherein if the collision probability $P_{coll}$ is larger than the predetermined threshold $P_{th}$, unidentified tags in the first group are identified by generating the new frame $L_1$ after the pilot frame $L_p$.

2. The method of claim 1, wherein in step a), the reader uses a bit mask to divide tags into a predetermined number of groups.

3. The method of claim 1, wherein in the additional pilot slot $L_{add}$, tags transmit identification numbers thereof to the reader when respective random counters of the tags, which continuously decrease from the pilot frame $L_p$, become 0, and
   collided tags in the additional pilot slot $L_{add}$ each select 0 or 1 as the respective random counter and each remaining unidentified tag increases the respective random counter by 1, after the collided tags in the additional pilot slot $L_{add}$ select 0 or 1 as the respective random counter each of the collided and remaining unidentified tags decreases the respective random counter sequentially and transmits an identification number at a time slot where the respective random counter becomes 0.

4. The method of claim 3, wherein in the new frame $L_1$, each unidentified tag, which is not identified in the pilot frame $L_p$, begins counting a new respective random counter and transmits an identification number to the reader when the new respective random counter become 0, and
   collided tags in the new frame $L_1$ each select 0 or 1 as the new respective random counter and each remaining unidentified tag increases the new respective random counter by 1, after collided tags in the new frame $L_1$ select 0 or 1 as the new respective random counter each of the collided and remaining unidentified tags sequentially decreases the new respective random counter and transmits an identification number at a time slot where the new respective random counter becomes 0.

5. The method of claim 4, wherein a size of the new frame $L_1$ is decided with a minimum value of n that satisfy an equation:

$$P_{coll} = 1 - P_{idle} - P_{succ}$$
$$= 1 - \left(1 - \frac{1}{L_p}\right)^n - n\frac{1}{L_p}\left(1 - \frac{1}{L_p}\right)^{n-1}.$$

where, n denotes the number of tags, $L_p$ denotes a size of a pilot frame, $P_{coll}$ denotes a collision probability, $P_{idle}$ denotes a valid probability, and $P_{succ}$ is a success probability.

6. The method of claim 1, wherein the tags are uniformly divided among the predetermined number of groups.

7. The method of claim 1, wherein the collision probability $P_{coll}$ is calculated by dividing a number of time slots where a collision occurs in a pilot frame $L_p$ by a number of total time slots of the pilot frame.

8. A method for identifying tags in a RFID system, comprising the steps of:
   a) at a reader, dividing tags in an identifiable area into a predetermined number of groups;
   b) identifying tags of a first group among the divided groups determined in step a), by applying a pilot frame $L_p$ to the first group;
   c) at the reader, calculating a collision probability $P_{coll}$ of tags after the pilot frame ends;
   d) identifying unidentified tags of the first group, which are not identified for the pilot frame, by allocating an additional pilot slot $L_{add}$ at an end of the pilot frame or generating a new frame $L_1$ according to the collision probability $P_{coll}$ by comparing the collision probability $P_{coll}$ with a predetermined threshold $P_{th}$,
   wherein if the collision probability $P_{coll}$ is smaller than the predetermined threshold $P_{th}$, the additional pilot slot $L_{add}$ is allocated at the end of the pilot frame $L_p$, to identify unidentified tags in the first group, and
   wherein if the collision probability $P_{coll}$ is larger than the predetermined threshold $P_{th}$, unidentified tags in the first group are identified by generating the new frame $L_1$ after the pilot frame $L_p$;
   e) deciding an optimal frame size $L_{opt}$ based on the number of tags of the first group, which are estimated through steps a) to d);
   f) identifying tags in a second group among the divided groups determined in step a), by applying the decided optimal frame size $L_{opt}$; and
   g) identifying tags of a current group among the divided groups determined in step a), by applying an optimal frame size $L_{opt}$ decided based on a number of identified tags in a previous group among the divided groups determined in step a) and repeating step g) for identifying tags in remaining groups among the divided groups determined in step a) after the second group.

9. The method of claim 8, wherein the optimal frame size $L_{opt}$ is decided by differentiating an equation for the number n of tags identified in the previous group, where the equation is:

$$T = \sum_{k=0}^{n} {}_nC_k \left(\frac{1}{L_{opt}}\right)^k \left(1 - \frac{1}{L_{opt}}\right)^{n-k} L_{opt}(\alpha_k + 1).,$$

wherein T denotes a total number of time slots for identifying tags, n is the number of identified tags in the previous group, k is a number of tags transmitted in one time slot, and $\alpha_k$ is an average number of time slots used for a binary tree algorithm when collision occurs.

10. The method of claim 9, wherein the optimal frame size $L_{opt}$ is 0.88n where n is the number of identified tags in the previous group.

11. The method of claim 10, wherein in steps f) and g), each of the tags transmits an identification number to the reader when a respective random counter becomes 0, tags collided in a corresponding frame select 0 or 1 as the respective random counter and each remaining unidentified tag increases a respective random counter by 1, and after tags collided in the corresponding frame select 0 or 1 as the respective random counter each of the collided and remaining unidentified tags sequentially decreases the respective random counter and transmits an identification number at a time slot where the respective random counter becomes 0.

12. The method of claim 8, wherein the tags are uniformly divided among the predetermined number of groups.

13. The method of claim 8, wherein the collision probability $P_{coll}$ is calculated by dividing a number of time slots where a collision occurs in a pilot frame $L_p$ by a number of total time slots of the pilot frame.

* * * * *